United States Patent
Garib

(10) Patent No.: US 9,216,674 B1
(45) Date of Patent: Dec. 22, 2015

(54) PORTABLE SEAT PARTITION UNIT

(71) Applicant: Rebecca A. Garib, Purcellville, VA (US)

(72) Inventor: Rebecca A. Garib, Purcellville, VA (US)

( * ) Notice: Subject to any disclaimer, the term of this patent is extended or adjusted under 35 U.S.C. 154(b) by 0 days.

(21) Appl. No.: 14/510,700

(22) Filed: Oct. 9, 2014

(51) Int. Cl.
*B60N 2/44* (2006.01)

(52) U.S. Cl.
CPC ..................... *B60N 2/441* (2013.01)

(58) Field of Classification Search
CPC ........................................ B60N 2/441
USPC ........................ 296/24.46, 24.4, 67
See application file for complete search history.

(56) References Cited

U.S. PATENT DOCUMENTS

| | | | |
|---|---|---|---|
| 2,006,883 A | | 7/1935 | La Rue Davies et al. |
| 3,467,432 A | | 9/1969 | Sullivan |
| 4,938,401 A | * | 7/1990 | Weisbrodt ............... B60R 7/043 108/44 |
| 5,123,707 A | * | 6/1992 | Wurzell ................... B60N 2/44 297/463.2 |
| 6,113,183 A | | 9/2000 | Koch et al. |
| 6,250,700 B1 | | 6/2001 | Traxler |
| 6,260,903 B1 | * | 7/2001 | von der Heyde ..... B60N 2/2821 296/24.46 |
| 6,286,882 B1 | | 9/2001 | Rastetter |
| 6,644,736 B2 | | 11/2003 | Nguyen |
| 7,562,931 B2 | | 7/2009 | Stojanovic |
| 8,272,674 B2 | | 9/2012 | Vance |
| 8,336,963 B1 | | 12/2012 | DeMonaco |
| 2005/0194827 A1 | * | 9/2005 | Dowty ..................... B60N 2/62 297/411.3 |
| 2012/0068490 A1 | * | 3/2012 | Vance .................... B60N 2/441 296/24.46 |
| 2013/0002001 A1 | | 1/2013 | Allen et al. |
| 2013/0328357 A1 | * | 12/2013 | Macleod ............... B60R 21/026 297/148 |

* cited by examiner

*Primary Examiner* — Jason S Morrow
*Assistant Examiner* — E Turner Hicks
(74) *Attorney, Agent, or Firm* — Winston & Strawn LLP

(57) ABSTRACT

An easy-to-use seat partition unit, a kit for transporting and assembling, and a method for establishing a physical barrier in mass transit vehicles is disclosed. The seat partition unit includes a movable partition panel which is physically connected to a partition base. The movable partition panel extends from an inoperative collapsed first position vertically from the central section of the partition base to an extended second position which is the operative configuration of the seat partition unit and is slid from the central section of the partition base either in a left or right longitudinal direction on upper tracks on the partition base such that the movable panel efficiently provides a barrier between the upper and lower bodies of adjacent passengers. The panel and base are configured and adapted to be placed into and frictionally held between adjacent passenger seats to support the seat partition unit in an upright position.

20 Claims, 5 Drawing Sheets

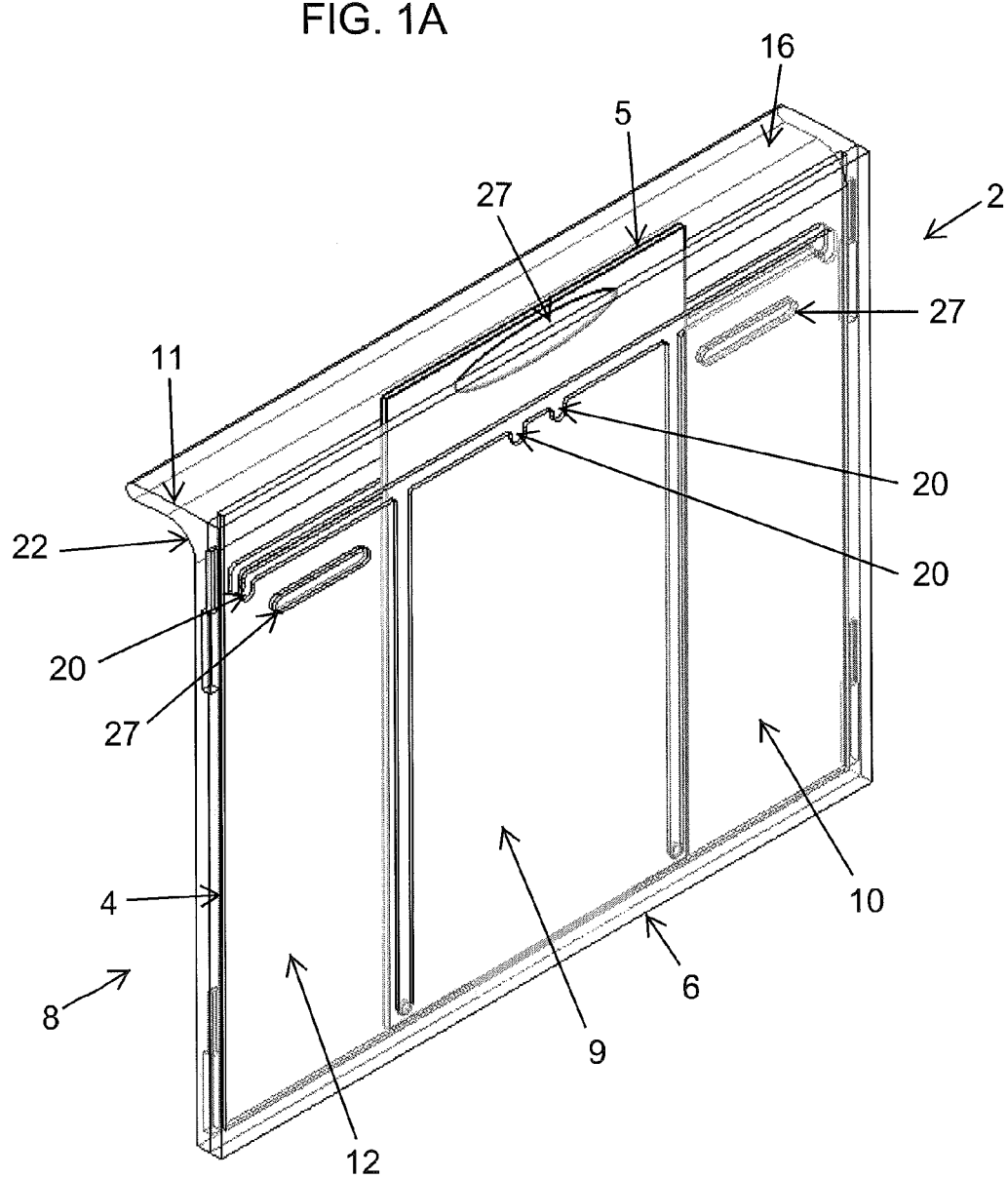

PORTABLE SEAT PARTITION UNIT

BACKGROUND OF THE INVENTION

The present invention relates to a temporary barrier primarily intended for use in passenger mass transport vehicles, and more particularly to portable and easily deployable and usable seat partition units for dividing passenger seats of passengers sitting adjacent to one another for efficiently separating the passenger space and thereby affording much needed privacy to the passenger using the seat partition unit.

DESCRIPTION OF THE PRIOR ART

Many people find physical proximity to be psychologically and physically disturbing and feel discomfort, anger, anxiety, and other effects when their personal space is encroached on or they are over-stimulated because of extensive crowded conditions. Increased heart rate, blood pressure, and skin conductance may occur when these people are in crowded areas, or areas that they anticipate will become crowded, where they have little or no control over maintaining their personal space and level of stimulation. These are everyday scenarios especially when people are dependent on mass transit vehicles that have become an essential and integrated part of people's lives. However this does not come without its limitations and problems as the space for seating generally is very limited particularly in big metropolitan cities, where crowding conditions are likely to take place, thereby making it that more essential that a passenger's personal space and privacy be protected from encroachment and intrusion from other passengers.

Notwithstanding the fact that there may exist barriers in mass transit vehicles, the barriers are too often inadequate in order to ensure proper separation, and further that each passenger remains within one space and does not encroach physically on the space of the person sitting adjacently. One seated passenger may eat, engage in personal grooming, cough, sneeze, physically rub against, stare and disturb the privacy, and otherwise provide unwanted stimuli to the person beside whom they are seated. This can lead to conflicts between passengers as each tries to assert control of the seating area, as well as discomfort of the passenger whose seating area has been encroached upon.

There exists prior art references that generally teach the concepts of physically permanently separating seat space in privately operated vehicles. However having said that, none of the prior art references have dealt with and addressed a portable and easily installable and deployable seat partition unit in order to effectively separate seating space in mass transit vehicles. Most of the prior art references disclose partitions of children seated in a rear seat of an automobile that may engage in squabbing, fighting, or other similar behavior that may be distracting to the individual operating the vehicle.

U.S. Pat. No. 5,123,707 issued to Wurzell provides a portable temporary seat divider for forming a physical barrier between adjacent children in the rear seat of a car, but does not address the problem of adults in mass transit vehicles. Wurzell's divider does not extend to a height above a child's eye level, thus it would not fully protect an adult from the upper body of a neighboring passenger. Wurzell's divider is also not sturdy enough to remain upright when the weight of an adult places pressure on either side of the divider because it is only supported by a tongue extending from the rear corner of the divider that is inserted into the crevice between the back and bottom of the rear seat.

U.S. Pat. No. 6,250,700 issued to Traxler teaches an apparatus and method for partitioning a vehicle particularly for use with public safety vehicles in transporting prisoners. The invention comprises a partition mounted adjustably on a mounting bracket. The partition slides along the mounting rails for side to side adjustment. The partition is hinged at the mounting bracket to allow opening of the partition flat against the wall.

U.S. Pat. No. 6,260,903 issued to Von der Heyde provides a portable partition for use in the passenger compartment of an automobile having a seat with a seat bench and a seat backrest. The partition includes a partition plate having a top edge that extends vertically to the ceiling of the automobile, a back edge that extends to the back of the passenger compartment, and a bottom edge connected to a seat plate that rests on the seat bench. The partition is supported in position by either the weight of adjacent passengers seated on the seat-plate on either side of the plate partition or a rear seat belt. This divider does not address the need for portable partitions for mass transit vehicles, because it is very large and cumbersome to carry around, requires the cooperation of the adjacent passenger, as he/she must agree to sit on top of the seat plate, and may require an additional support, such as a seat belt, in order to secure the partition in place.

U.S. Pat. No. 6,286,882 issued to Rastetter teaches a motor vehicle that has a vehicle interior and a partition which divides the vehicle interior into a front area that has a driver's side, and a passenger side and a rear area. The partition is divided into at least two partial units that abut one another in a transverse direction of the vehicle. One partial unit of the partition is immovably mounted behind a driver's side of the front area. At least one additional partial unit is movable between two end positions, with the end positions opening or closing a passageway area between the front area and the rear area.

U.S. Pat. No. 6,644,736 issued to Nguyen provides a fan-type foldable device for sub-dividing the space occupied by passengers seated in a moving vehicle or a movie theatre for privacy purposes. The fan-type device is permanently coupled to one side of a seat back and folds out of the way when not in use. This divider does not address passenger's need for portable partitions for mass-transit vehicles without adequate seat dividers, as it requires permanent installation of the fan-type foldable device.

U.S. Pat. No. 8,272,674 issued to Vance teaches a partition for use in vehicles having interior cabin space including at least one row of seats which includes a deformable frame and at least one attachment device. The at least one attachment device attaches the deformable frame to a portion of a vehicle. Upon installation in a vehicle, the deformable frame separates a first passenger seat of the vehicle from a second passenger seat in the same row.

U.S. Pat. No. 8,336,963 issued to DeMonaco provides a removable armrest that is placed between a pair of sofa cushions. It is comprised of a resilient section and a downward-extending tab, and the downward-extending tab is pushed downward into the space between two cushions on a sofa to position and frictionally hold the armrest in place. This armrest does not address the problem faced by passengers of mass transit vehicles, as it provides only a comfortable support for a person's arm, but no barrier to separate the upper body portions, including the arms, of adjacent passengers. This can lead to conflicts between passengers, as the adjacent passenger may attempt to use the armrest as well. Furthermore the resilient section of the armrest has a diameter of at least five inches, which limits the compactness and ease of portability of the device.

US Application Publication with No. US 2013328357 discloses a seat divider for an automobile configured to create a barrier between children seated in the back seat of an automobile which also allows visual contact and communications between them through a two-way viewing window and a top divider panel that can be raised and lowered when needed. The seat divider has specially configured seat belt and shoulder strap hooks that allow the middle seat belt and shoulder strap to be inserted through them to firmly secure the seat divider to the back seat of the vehicle.

While the prior art mentioned hereinabove teaches various forms of partitions with distinct functionalities, none of the herein-described prior art teaches or discloses passenger seat partitions or physical dividers that are for short-term use in mass transit vehicles, portable, easy to install and detach, and suitable for partitioning seating space between adjacent individuals in mass transit vehicles. They either require a permanent installation within the seats of a vehicle or extensive temporary installation within a private vehicle, are not sized for ready portability, and most significantly, they do not provide the amount of protection needed so as to prevent neighboring passengers from encroaching upon one another's seating space.

Therefore there is a need in the art for compact, portable seat partitions for use by passengers of mass transit vehicles that are easily secured between adjacent seats, and moreover, which are capable of physically confining adjacent passengers to their allotted space. As such, this need is satisfied by the various embodiments of the present invention.

SUMMARY OF THE INVENTION

The present invention now provides an easy-to-use, portable and easily deployable seat partition unit which efficiently provides a physical barrier covering both the upper and lower bodies of adjacently sitting passengers in a mass transport vehicle. The seat partition unit is dimensioned and configured to be placed between a pair of passenger seats, and the passenger seats will frictionally retain the partition unit in an upright position such that a physical barrier is efficiently established and maintained throughout the whole duration of the mass transit transportation.

The main core elements of the seat partition unit in accordance with the embodiments of the present invention comprises i) a movable partition panel and ii) a partition base. The movable partition panel is in a physical communication with the partition base and the movable partition panel is moved and slid on tracks that are built on the partition base. The partition base comprises at least two and preferably three sections which are the a) central section, b) right section and c) left section. The movable partition panel extends from a inoperative configuration, referred to as the first position from the central section of the partition base in a vertical direction to an extended operative configuration, referred to as the second position.

The movable partition panel is extracted from one section so that it protrudes from the body of the partition base. Thereafter it can either be slid or moved in a right longitudinal direction, or in a left longitudinal direction. As explained previously this is made possible thanks to the partition base having a panel support structure, typically of a shelf or longitudinal upper tracks built thereon such that the movable partition panel can be slid on the partition base. The movable partition panel efficiently stays in an upward position and can be seated in a plurality of notches on the shelf or upper track that is constructed on the partition base. As such after sliding the movable partition panel from one section of the partition base either in a right or left longitudinal direction, the movable partition panel is subsequently slid forward or back respectively on the upper track all depending on whether the movable partition panel has been slid in a right or left longitudinal direction first. The movable partition panel is then subsequently dropped into the aforementioned plurality of notches such that it effectively stays in an upward position, which is physically capable of separating the space of one passenger relative to the other, when the seat partition unit is subsequently placed and frictionally retained between the seat backs of adjacent seats. On the other hand, in the inoperative first position, wherein the movable partition panel is in a collapsed configuration, it allows for easy storage, carriage and transportation such that an easy-to-use multi-functional seat partition unit is advantageously afforded.

In another aspect of the present invention, a kit is contemplated for transporting and assembling a seat partition unit having a container, a movable partition panel, and a partition base wherein the movable partition panel and partition base are configured to fit together inside the container. The kit may further include additional accessories such as an arm cushioning accessory in order to enhance the user's comfort and address other potential needs.

i) In yet another aspect of the present invention there is disclosed a method for dividing passenger space between two seats comprising the steps of i) providing a seat partition unit as explained above; ii) extending the movable partition panel vertically from the central section of the seat partition base such that the movable partition panel assumes an operative extended second position configuration different from the inoperative collapsed first position; iii) sliding the movable partition panel horizontally onto the support surface of the partition base, with the movable partition panel maintained in an upright position protruding out of the body of the partition base; iv) inserting the lower portion extending from the bottom edge of the partition base between two adjacent seat bottoms; v) and pushing the partition base into the space between the seat backs for operative engagement in the space between the seat backs and the bottom of the adjacent seats, whereby a sturdy physical barrier is established that can efficiently separate a space between at least two passengers.

These and other advantages of the present invention will become apparent from the subsequent detailed description of the invention and the appended claims taken in conjunction with the accompanying drawings.

BRIEF DESCRIPTION OF THE DRAWINGS

FIG. 1A depicts a perspective view of a seat partition unit, wherein the movable partition panel is in a collapsed inoperative first position.

DETAILED DESCRIPTION OF THE PREFERRED EMBODIMENTS

Figure 1B:
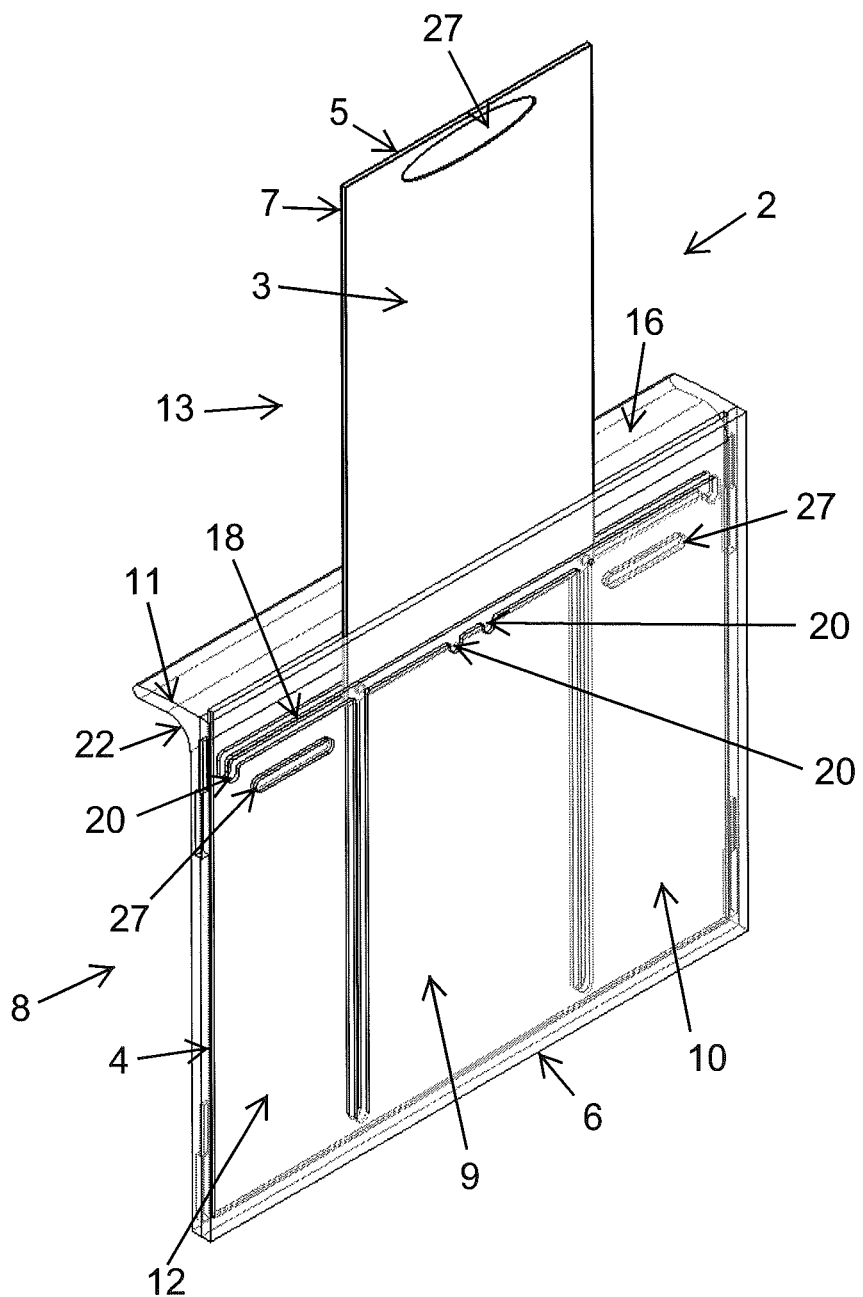
FIG. 1B demonstrates a perspective view of a seat partition unit, wherein the movable partition panel is in an operative second position wherein the movable partition panel extends vertically from the central section of the partition base.

In this respect there has thus been outlined rather broadly the more important features of the instant invention in order that the detailed description thereof that follows may be better understood, and in order that the present contribution to the art may be better appreciated.

There are additional features of the instant invention which will be described hereinafter and which will form the subject matter of the claims appended hereto.

Further in relation to this before explaining at least the preferred embodiments of the invention in greater detail, it is to be understood that the invention is not limited in its application to the details of construction and to the arrangements of the components set forth in the following description or illustrated in the appended Figures. The invention is capable of other embodiments and of being practiced and carried out in different ways. Also it is to be understood that the terminology used herein is for the purpose of description and should not be regarded as a limiting factor.

As such those having ordinary skill in the art will appreciate that the conception upon which this disclosure is based may also be utilized as a basis for designing other structures for carrying out the several purposes of the present invention. It is therefore equally important that the claims be regarded as including such equivalent constructions insofar as they do not depart from the spirit and scope of the present invention.

As a preliminary matter, it will readily be understood by one having ordinary skill in the relevant art that the present invention has broad utility and application. Furthermore any embodiment discussed and identified as being "preferred" is considered to be part of a best mode contemplated for carrying out the present invention. Other embodiments also may be discussed for additional illustrative purposes in providing a full and enabling disclosure of the present invention. Moreover many embodiments such as adaptations, variations, modifications, and equivalent arrangements will be implicitly disclosed by the embodiments described herein and fall within the scope of the present invention.

Accordingly while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed to limit the scope of patent protection afforded by the present invention, which scope is to be defined by the claims and the equivalents thereof. It is not intended that the scope of patent protection afforded the present invention be defined by reading into any claim a limitation found herein that does not explicitly appear in the claim itself.

Thus for example any sequence(s) and/or temporal order of steps of various processes or methods that are described herein are illustrative and not restrictive. Accordingly it should be understood that although steps of various processes or methods may be shown and described as being in a sequence or temporal order, the steps of any such processes or methods are not limited to being carried out in any particular sequence or order, absent an indication otherwise. Indeed the steps in such processes or methods generally may be carried out in various different sequences and orders while still falling within the scope of the present invention. Accordingly it is intended that the scope of patent protection afforded the present invention is to be defined by the appended claims rather than the description set forth herein.

Additionally it is important to note that each term used herein refers to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

The following definitions generally set forth the parameters of the present invention.

As used herein, the term "longitudinal" refers to the running lengthwise rather than across the width of a material.

As used herein, the term "height" is the measurement of a vertical distance, whereas the term "length" is the measurement of a horizontal distance.

As used herein, the term "first position" refers to the movable partition panel being in a collapsed inoperative configuration relative to the partition base. This configuration is especially suitable for and facilitates carriage and transportation of the seat partition unit.

As used herein, the term "second position" refers to the movable partition panel being in a vertically extended operative configuration relative to the partition base. After extending vertically from the midsection of the partition base, the movable partition panel can either be slid in a longitudinal right or left direction away from the central section.

As used herein, the term "mass transit vehicle" refers to any transportation system where a large number of people are gathered such that the privacy of a given passenger may be severely compromised, and the "mass transit vehicle" may include the following but not limited to buses, trolleybuses, trams, trains, and rapid transit means. e.g. metro/subways/undergrounds etc.

As used herein, the term "notch" refers to a cleft, indentation, a groove or the like.

As used herein, the term "arched" or "curved" are used interchangeably.

As used herein, the term "collapsed" configuration refers to an inoperative "first position" configuration of the movable partition panel, whereas the term "extended" configuration refers to an operative "second position" configuration of the movable partition panel.

As used herein, the term "diameter" refers to any straight line segment that passes through the center of a circle or half-circle and whose endpoints lie on the circle or half-circle.

As used herein, the term "sufficient" is meant to have the equivalent meaning of adequate and enough.

As used herein, the term "substantially" is meant to have the equivalent meaning of essentially, largely, considerably or the like.

As used herein, the term "maximum" refers to the greatest quantity or value attainable or attained.

As used herein, the term "minimum" refers to the least quantity assignable, admissible, attainable or possible.

As used herein, "a" and "an" each generally denotes "at least one" but does not exclude a plurality unless the contextual use clearly dictates otherwise.

As used herein, the singular form "a", "and", and "the" include plural referents unless the context clearly dictates otherwise.

The various embodiments of the present invention provide a portable and easily deployable and adjustable seat partition unit for use in mass transit vehicles and transportation systems that can rapidly be secured between adjacent seats with the ultimate goal of preventing adjacent neighboring passengers from encroaching on one another's seating space of privacy. Thus the inherent and immediate advantages of the seat partition unit are i) to effectively afford a complete physical barrier between neighboring passengers so as to block the individual from the upper and lower body portions of the adjacent passenger; ii) to withstand physical pressure subjected on the seat partition unit by virtue placed on the seat partition unit by a neighboring individual thereby advantageously keep the neighboring individual from invading the user's private space; iii) to securely and easily affix and attach into and subsequently detach from the passenger seats; iv) to provide a portable and light in nature partition unit, which is sized to fit within a travel item; v) to provide a seat partition unit, which may be made from a variety of different materials such as but not limited to wood, plastic, metal or any combination thereof; vi) to set forth a seat partition unit, which further includes an armrest-structure so as to increase a passenger's comfort and is cost-effective from both a manufacturer's and consumer's viewpoint.

Now referring to the drawings in which like numerals represent like components throughout the several views, the preferred embodiments of the present invention are next described. The following description of one or more preferred embodiment(s) is merely exemplary in nature and is in no way intended to limit the invention, its application, or uses.

Figure 2:
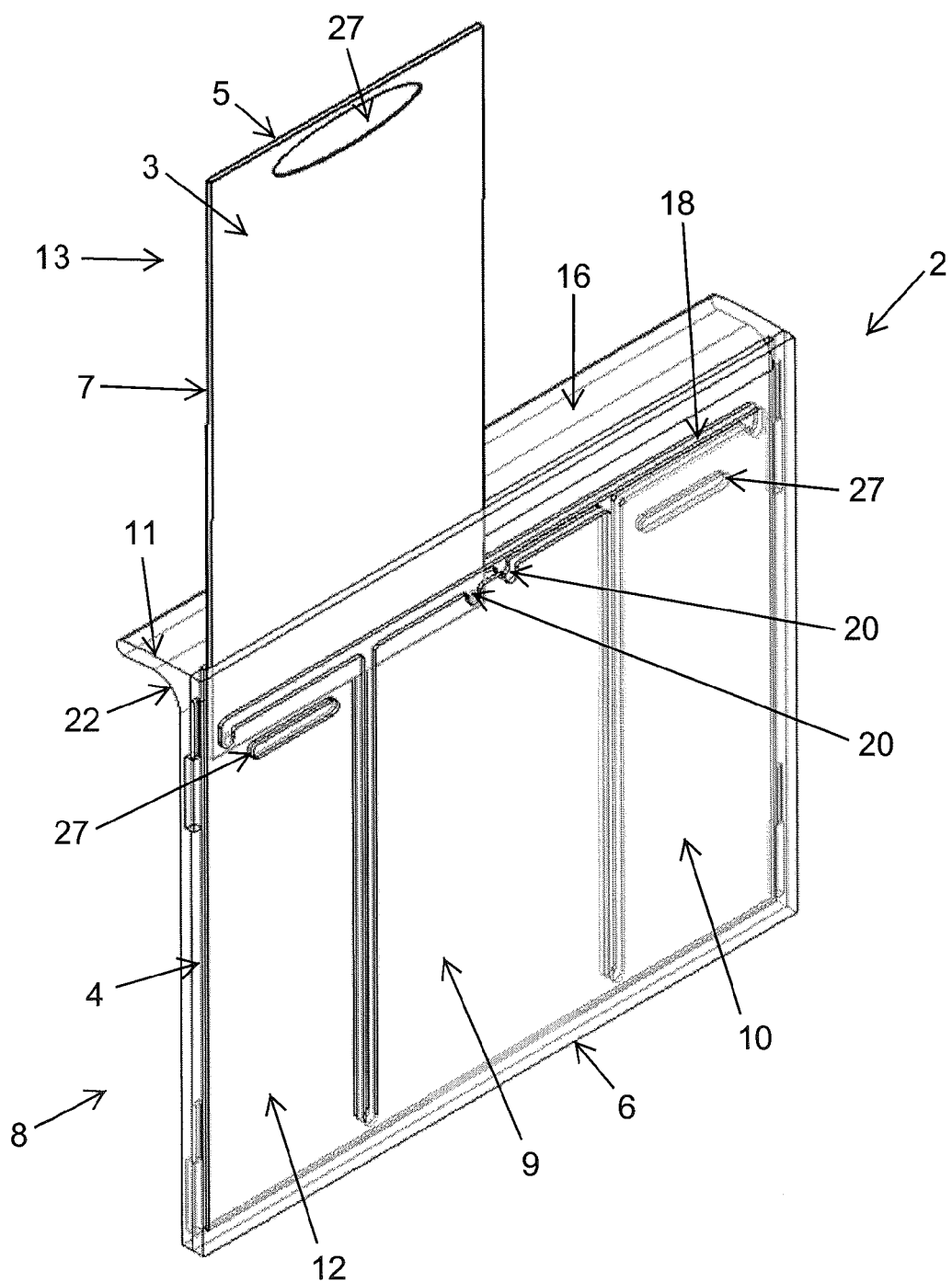
FIG. 2 demonstrates a perspective view of a seat partition unit, wherein the movable partition panel is in an operative second position wherein the movable partition panel slides in a right longitudinal direction away from the central section of the partition base.
Figure 3:
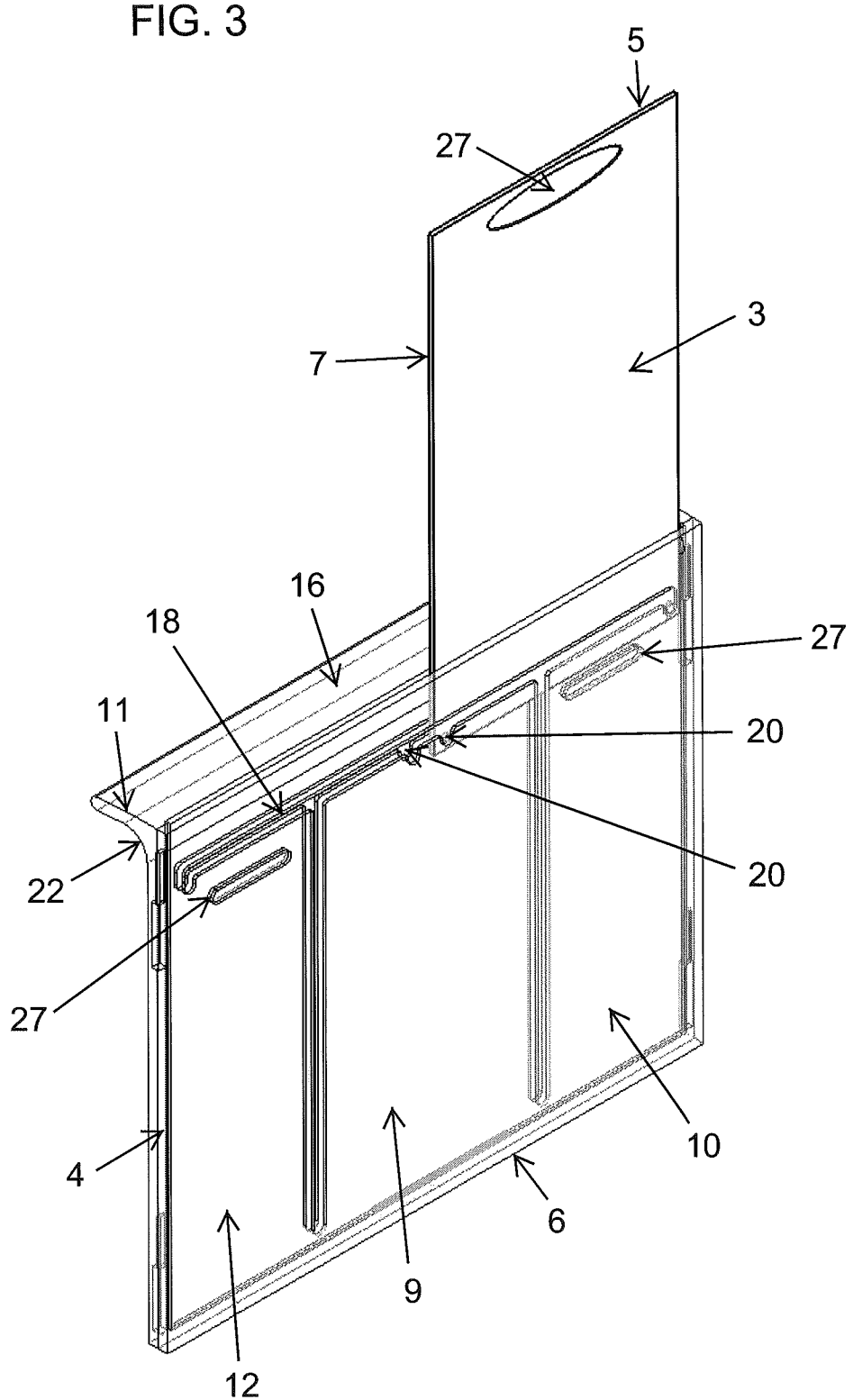
FIG. 3 demonstrates a perspective view of a seat partition unit, wherein the movable partition panel is in an operative second position wherein the movable partition panel slides in a left longitudinal direction away from the central section of the partition base.

FIGS. 1-4 depict the preferred embodiments of the present invention. The present invention specifically relates to a seat partition unit 2, which has a rectangular shape as depicted in FIGS. 1-3. The main core components of the seat partition unit 2 in accordance with the preferred embodiment of the present invention comprise i) a movable partition panel 13 in physical operative communication with ii) a partition base 8, which is composed of a central section 9, a left section 10 and a right section 12. The partition base 8 has a neighbor-facing surface comprising the central section 9, the left section 10 and the right section 12. The partition base 8 further has a top edge 11, bottom edge 6, and vertical edges 4. The rectangular movable partition panel 13 also has a neighbor-facing surface 3, horizontal edges 5 and vertical edges 7. The neighbor-facing surface 3 of the rectangular movable partition panel 13, as well as the left 10 and right 12 sections of the partition base 8 have a substantially oval indentation 27 embossed thereon which aids in providing and affording a controlled grip to the user during transportation of the seat partition unit 2, or extension of the movable partition panel 13. Both the movable partition panel 13 and the partition base 8 also have user-facing surfaces, which are 180 degrees opposite the neighbor-facing surfaces as described herein-above. The partition base 8 further has an arched or curved 22 armrest structure 16 which has a flat surface throughout the longitudinal length of the partition base 8.

The armrest structure 16 is sufficiently wide enough so as to support a human forearm without extending beyond the neighbor-facing surface of the partition base 8, or otherwise impede the functionality of the movable partition panel 13. In another embodiment of the present invention, the seat partition unit 2 includes an arm cushioning accessory for detachable association with the top edge 11 of the partition base 8, wherein the arm cushioning accessory is a generally elongated cushion adapted to rest on the top edge 11 of the partition base 8 without extending beyond the neighbor-facing surface of the partition base 8, and wherein the partition base 8 and the arm cushioning accessory have complementary anchoring means for detachably anchoring the cushion to the top edge 11 of the partition base 8.

In addition the partition base 8 has built thereon a plurality of notches 20 and upper tracks 18 and the advantage of these structures will immediately become apparent and appreciated by the person having skill in the art to which this invention belongs with the following description provided hereinbelow.

Figure 4:
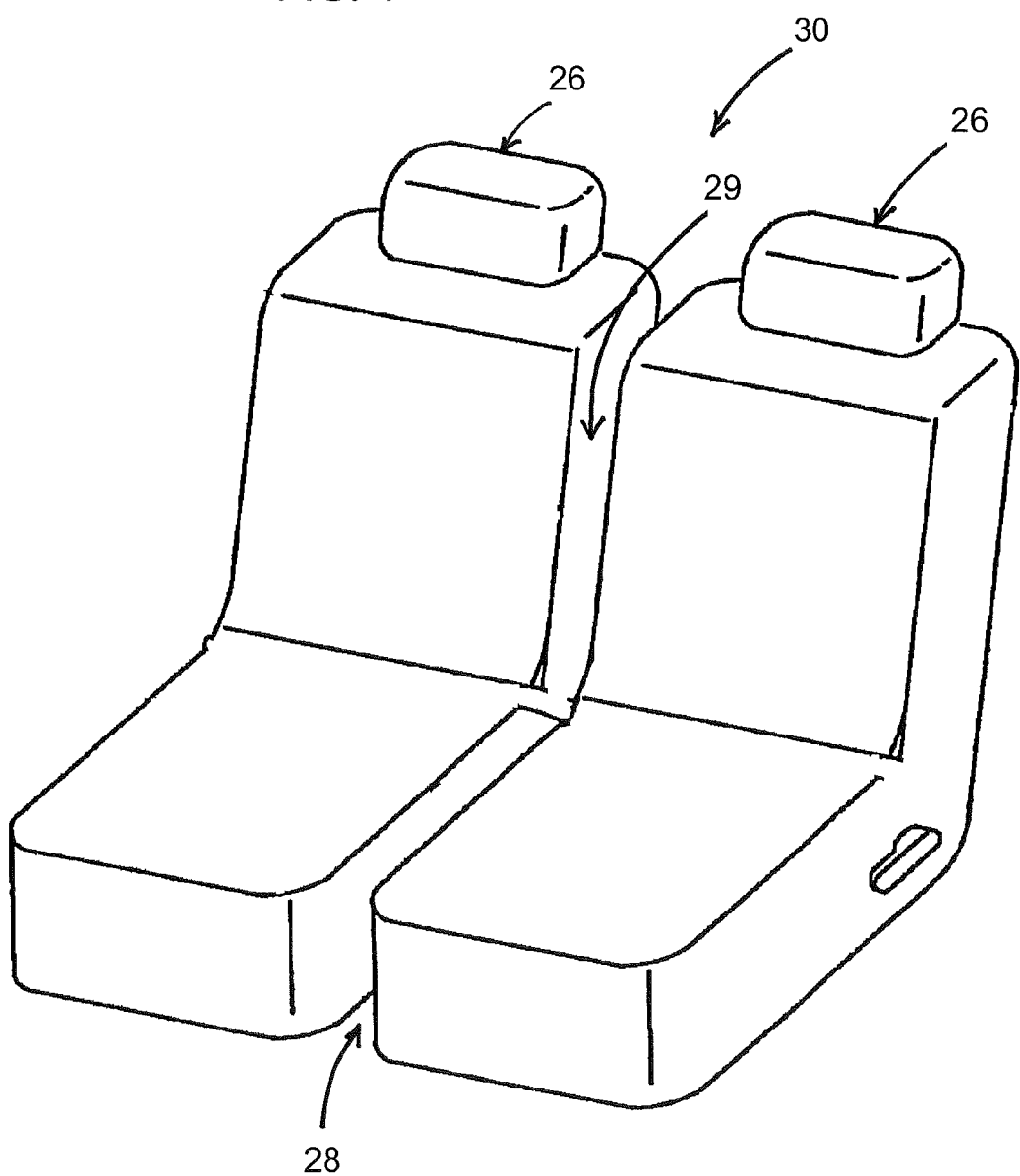
FIG. 4 illustrates an example of a seating arrangement wherein the seat partition may be utilized.

The material that the seat partition unit 2 and the movable partition panel 13 are made of may encompass any material that allows for deformability in order to ensure a snug fit between the space 29 of the back 26 and space of the bottom 28 of neighboring seats 30 wherein a pair of seats reflects a possible seating arrangement of two passengers as demonstrated in FIG. 4.

Such material may advantageously and preferably be composed of wood, plastic, metal or any combination thereof that is readily apparent to the skilled artisan. Advantageously whether deformable or not, the material used is necessarily capable of withstanding the pressure placed on it by an adjacent passenger, thereby protecting the user from such external stimuli. Embodiments of the present invention may also be partially covered with fabric, can be colored with one or multiple colors or designs, or have other decorations in order to appeal to various user's aesthetic tastes.

The height of the partition base 8 and the movable partition panel 13 is typically at least approximately 10 inches (25.4 cm), whereas the longitudinal length of the partition base 8 is normally at least around 12 inches (30.5 cm) and its width is typically at least about 0.5 inches (1.3 cm). The longitudinal length of the movable partition panel 13 is typically at least around 5 inches (12.7 cm). The longitudinal length of the armrest structure 16 is also customarily at least about 12 inches (30.5 cm) and the length of the arch or curvature on the armrest structure 16 from the center portion of the arch or curvature to the tip of the end portion is frequently at least about 1.50 inches (3.80 cm). The diameter of the plurality of notches 20 is typically at least approximately 0.75 inches (1.90 cm).

In the FIGS. 1-3, it is demonstrated that the thickness of the partition base 8 is uniform along its vertical height from top edge 11 to bottom edge 6. In other embodiments of the present invention, the thickness of the partition base 8 may vary along its vertical edge 4 such that at least one segment of the partition base 8 is wider than the portion of the partition base 8 extending from the segment to the bottom edge 4 such that the segment limits the depth of insertion of the partition base 8 between the seat bottoms 28 of adjacent seats 30 to a depth at which the seat partition unit 2 is supported in a substantially upright position. In yet another embodiment of the present invention, the thickness of the partition base 8 may taper off smoothly from a maximum thickness at its top edge 11 to a minimum thickness at its bottom edge 6.

As explained previously, the movable partition panel 13 can exist in two operatively distinct configurations, which are the i) collapsed inoperative position referred to as the first position, which is depicted in FIG. 1A and ii) the extended operative configuration referred to as the second position shown in FIG. 1B. In both configurations, the movable partition panel 13 is in physical communication with at least the central section 9 of the partition base 8. In the inoperative first position the movable partition panel 13 is as explained hereinabove in the collapsed configuration, which allows for easy storage, carriage or transportation of the seat partition unit 2 for the user when not being used. The movable partition panel 13 of the seat partition unit 2 is transferred from the collapsed inoperative first position as depicted in FIG. 1A to the substantially operative extended second position as demonstrated in FIG. 1B, and FIGS. 2-3 in the following manner. A user first makes contact with the movable partition panel 13 and gently pulls the movable partition panel 13 from the collapsed configuration shown in FIG. 1A along the central section 9 of the partition base 8 to the extended position demonstrated in FIG. 13B. Further proceeding and extending from the central section 9, the movable partition panel 13 is either slid along the upper tracks 18 on the partition base 8 in a right direction as shown in the preferred embodiment in FIG. 2, or in a left direction as depicted in FIG. 3. All depending on which extended direction the user has chosen to slide the movable partition panel 13, the movable partition panel 13 is then subsequently either slid forward or back on the upper tracks 18, and then thereafter, the movable partition panel 13 is dropped into the plurality of notches 20 and rested on the upper tracks 18 on the partition base 8 such that the partition panel 13 protrudes out of the body of the partition base 8 and effectively remains at an upright sturdy and steady configuration. Once the seat partition unit 2 is in this upright position, in order to effectively provide a physical barrier, the lower portion extending from the bottom edge 6 of the partition base 8 can subsequently be maneuvered and inserted into the space between adjacent neighboring seat bottoms 28, wherein the formation of two neighboring seats is depicted in FIG. 4. When this has been done, the partition base 8 is subsequently pushed back into the space 29 between the seat backs 26 so that at least a part of the leading portion of the armrest structure 16 is tugged in between the space 29 of the seat backs 26. The seat partition unit 2 maintains its vertical barrier configuration between the passengers through means of effective friction provided when inserted into the space 29 between the adjacent seat backs 26 and the seat bottoms 28. As such when the user has executed these steps, the user can subsequently rest his/her arm on the portion of the armrest structure 16 horizontally protruding out of the space 29 of the seat backs 26, wherein the seat partition unit 2 efficiently maintains its sturdy upright configuration without collapsing at all times. The central section 9, the left section 10 and the right section 12 of the partition base 8 and the surface 3 of the movable partition panel 13 will then subsequently face the adjacent neighboring passenger, whereas the opposite surfaces 180 degrees from the neighbor-facing units will instead face the user of the seat partition unit 2.

In yet another embodiment of the present invention, a kit is provided for transporting and assembling the portable seat partition unit 2 comprising a container, a movable partition panel 13 and a partition base 8 according to the previously described embodiment, wherein the movable partition panel 13 and partition base 8 are configured to fit together inside the kit container. Embodiments of this kit may include any variations of these components that meet the limitations disclosed herein, including those discussed above. In yet another embodiment, the kit further comprises an arm cushioning accessory for detachable association with the top edge 11 of the partition base 8 wherein the arm cushioning accessory is a generally elongated cushion adapted to rest on the top edge 11 of the partition base 8 without extending beyond the neighbor-facing surface of the partition base 8, and wherein the partition base 8 and the arm cushioning accessory have complementary anchoring means for detachably anchoring the cushion to the top edge 11 of the partition base 8, wherein the movable partition panel 13, partition base 8, and arm cushioning accessory are all configured to fit together inside the container. Additionally the container may be made of fabric that is substantially configurable into the shape of a right prism and attachable to the top edge 11 of the partition base 8 to serve as an armrest.

In still a further embodiment of the present invention, a method for efficiently dividing passenger space between two seats is contemplated comprising the steps of providing i) a seat partition unit 2 according to the previously described embodiments; ii) extending the movable partition panel 13 vertically from the central section of the partition base 8 such that the movable partition panel 13 assumes an operative extended second position configuration different from the inoperative collapsed first position; iii) sliding the movable partition panel 13 either in a right or left extended position and then sliding the movable partition panel 13 either forward or back on the upper track 18 on the partition base 8; iv) dropping the slid movable partition panel 13 into the plurality of notches 20 built on the partition base 8 such that the movable partition panel 13 is rested on the upper track 18 on the partition base 8 in an upright position protruding out of the body of the partition base 8; v) inserting the lower portion extending from the bottom edge 6 of the partition base 8 between two adjacent seat bottoms 28; and vi) and pushing the partition base 8 into the space 29 between the seat backs 26 for operative engagement in the space 29 between the seat backs 26 and the bottom 28 of the adjacent seats 30, whereby a sturdy physical barrier is established that can efficiently separate a space between at least two passengers.

In sum it is to be understood and realized that since numerous modifications and changes will readily be apparent to those having ordinary skill in the art it is not desired to limit the invention to the exact entities as specifically demonstrated in this disclosure. Accordingly all suitable modifications and equivalents may be resorted to falling within the scope of the invention. Thus it should be understood that various features and aspects of the disclosed of the disclosed embodiments can be combined with or substituted for one another in order to form varying modes of the disclosed invention. As such the described dimensions, materials used for the manufacture of the seat partition unit or the kit container etc., methods of use should not only be construed to be limited to specifically cover what has exclusively been described in this disclosure.

Unless defined otherwise, all technical and scientific terms used herein have same meaning as commonly understood by the person of ordinary skill in the art to which this invention belongs. Thus the scope of the embodiments of the present invention should be determined by the appended claims and their legal equivalents rather than by the Figures.

What is claimed is:

1. A portable seat partition unit for use in vehicles having at least a pair of seats comprising:
 a movable partition panel having a neighbor-facing surface and horizontal and vertical edges adjoining the neighbor-facing surface; and
 a partition base having a neighbor-facing surface, top, bottom and vertical edges adjoining the neighbor-facing surface, and a panel supporting structure;
 wherein the neighbor-facing surface of the partition base comprises at least two adjacent sections;
 wherein the partition base has a thickness that: (a) is uniform along its vertical height from top edge to bottom edge, (b) varies along its vertical edge such that at least one segment of the partition base is wider than the portion of the partition base extending from the segment to the bottom edge such that the segment limits the depth of insertion of the partition base between the seat bottoms of adjacent seats to a depth at which the seat partition unit is supported in a substantially upright position, or (c) tapers off smoothly from a maximum thickness at its top edge to a minimum thickness at its bottom edge;
 wherein the movable partition panel slides in a vertical direction from an inoperative first position located within the partition base in one section to an operative second position where the panel protrudes out of the body of the partition base, with the movable partition panel moved horizontally onto the supporting structure of the partition base to maintain the panel in the second position;

wherein the movable partition panel is adapted and dimensioned to provide a barrier to physically separate an upper-body portion of at least two passengers seated in adjacent seats and at least one edge of the movable partition panel is adapted and dimensioned to be received into and frictionally retained between the space of the seat back of the adjacent seats so as to support the seat partition unit in an upright position between the adjacent seats; and wherein the partition base is adapted and dimensioned to provide a barrier to physically separate the lower-body portion of at least two passengers seated in adjacent seats and has a lower portion extending from the bottom edge which is adapted and dimensioned to be received into and frictionally kept in place between the space of the seat bottoms of adjacent seats so as to support the seat partition unit in an upright position between the adjacent seats.

2. The seat partition unit of claim 1, wherein the support structure comprises a shelf or upper track that supports the panel in the second position.

3. The seat partition unit of claim 1, wherein the support structure includes notches for seating the partition in the shelf or upper track.

4. A portable seat partition unit for use in vehicles having at least a pair of seats comprising:
   a movable partition panel having a neighbor-facing surface and horizontal and vertical edges adjoining the neighbor-facing surface; and
   a partition base having a neighbor-facing surface, top, bottom and vertical edges adjoining the neighbor-facing surface, and a panel supporting structure;
   wherein the neighbor-facing surface of the partition base comprises at least two adjacent sections;
   wherein the movable partition panel slides in a vertical direction from an inoperative first position located within the partition base in one section to an operative second position where the panel protrudes out of the body of the partition base, with the movable partition panel moved horizontally onto the supporting structure of the partition base to maintain the panel in the second position;
   wherein the movable partition panel is adapted and dimensioned to provide a barrier to physically separate an upper-body portion of at least two passengers seated in adjacent seats and at least one edge of the movable partition panel is adapted and dimensioned to be received into and frictionally retained between the space of the seat back of the adjacent seats so as to support the seat partition unit in an upright position between the adjacent seats;
   wherein the partition base is adapted and dimensioned to provide a barrier to physically separate the lower-body portion of at least two passengers seated in adjacent seats and has a lower portion extending from the bottom edge which is adapted and dimensioned to be received into and frictionally kept in place between the space of the seat bottoms of adjacent seats so as to support the seat partition unit in an upright position between the adjacent seats; and
   wherein the sections include a central section, a left section and a right section and the panel after being moved from the first position is further slid horizontally either in a right or left direction and then slid either forward or back on the upper track of the partition base and thereafter placed onto the shelf or upper track in the notches of the support structure of the partition base such that the movable partition panel is maintained in an upright position protruding out of the body of the partition base for engagement of at least a portion of the movable partition panel between the seat backs of the adjacent seats.

5. The seat partition unit of claim 1, wherein the partition base and the movable partition panel are made from plastic, metal, wood or a combination thereof.

6. The seat partition unit of claim 1 further comprising an armrest structure that is sufficiently wide to support a passenger's arm without extending beyond the neighbor-facing surface of the partition base or impede the functionality of the movable partition panel.

7. The seat partition unit of claim 1, wherein the partition base has a height of at least about 10 inches (25.4 cm), a longitudinal length of at least about 12 inches (30.5 cm) and a width of at least about 0.5 inches (1.3 cm).

8. The seat partition unit of claim 1, wherein the movable partition panel has a height of at least approximately 10 inches (25.4 cm) and a longitudinal length of at least about 5 inches (12.7 cm).

9. The seat partition unit of claim 6, wherein the armrest structure has a longitudinal length of at least about 12 inches (30.5 cm).

10. The seat partition unit of claim 3, wherein the notches each have a diameter of at least about 0.75 inches (1.9 cm).

11. The seat partition unit of claim 4, wherein the neighbor-facing surface of the movable partition panel and the left and right sections of the partition base have a substantially oval indentation embossed thereon which aids in providing a controlled grip to the user during transportation of the seat partition unit or extension of the movable partition panel.

12. The seat partition unit of claim 4, wherein the thickness of the partition base is uniform along its vertical height from top edge to bottom edge.

13. The seat partition unit of claim 4, wherein the thickness of the partition base varies along its vertical edge such that at least one segment of the partition base is wider than the portion of the partition base extending from the segment to the bottom edge such that the segment limits the depth of insertion of the partition base between the seat bottoms of adjacent seats to a depth at which the seat partition unit is supported in a substantially upright position.

14. The seat partition unit of claim 4, wherein the thickness of the partition base tapers off smoothly from a maximum thickness at its top edge to a minimum thickness at its bottom edge.

15. A kit for transportation and assembly of a portable seat partition unit comprising:
   a container;
   a movable partition panel configured and dimensioned to provide a barrier to physically separate an upper-body portion of at least two passengers seated in adjacent seats, the movable partition panel having a neighbor-facing surface and horizontal and vertical edges adjoining the neighbor-facing surface, wherein at least one edge of the movable partition panel is adapted and dimensioned to be received into and frictionally retained between the space of the seat back of the adjacent seats so as to support the seat partition unit in an upright position between the adjacent seats; and
   a partition base configured and dimensioned to provide a barrier to physically separate the lower-body portion of at least two passengers seated in adjacent seats and has a lower portion extending from the bottom edge which is adapted and dimensioned to be received into and frictionally kept in place between the space of the seat bottoms of adjacent seats so as to support the seat partition unit in an upright position between the adjacent seats;

wherein the movable partition panel slides in a vertical direction from a collapsed inoperative first position from the central section of the partition base to an operative extended second position;

wherein the movable partition panel is subsequently slid either in a right or left direction from the central section and then slid either forward or back and then dropped into a plurality of notches built on the partition base such that the movable partition panel is rested on the upper track on the partition base in an upright position protruding out of the body of the partition base for engagement of at least a portion of the movable partition panel between the seat backs of the adjacent seats; and wherein the movable partition panel and partition base are built such that they can fit inside the container.

16. A method for physically separating passenger space between at least two seats comprising the steps of:
   i) providing a seat partition unit comprising:
      a movable partition panel having a neighbor-facing surface and horizontal and vertical edges adjoining the neighbor-facing surface;
      a partition base having a neighbor-facing surface, top, bottom and vertical edges adjoining the neighbor-facing surface, and a panel supporting structure; and
      wherein the neighbor-facing surface of the partition base comprises at least two adjacent sections;
      wherein the movable partition panel slides in a vertical direction from an inoperative first position located within the partition base in one section to an operative second position where the panel protrudes out of the body of the partition base, with the movable partition panel moved horizontally onto the supporting structure of the partition base to maintain the panel in the second position;
      wherein the movable partition panel is adapted and dimensioned to provide a barrier to physically separate an upper-body portion of at least two passengers seated in adjacent seats and at least one edge of the movable partition panel is adapted and dimensioned to be received into and frictionally retained between the space of the seat back of the adjacent seats so as to support the seat partition unit in an upright position between the adjacent seats; and
      wherein the partition base is adapted and dimensioned to provide a barrier to physically separate the lower-body portion of at least two passengers seated in adjacent seats and has a lower portion extending from the bottom edge which is adapted and dimensioned to be received into and frictionally kept in place between the space of the seat bottoms of adjacent seats so as to support the seat partition unit in an upright position between the adjacent seats;
   ii) extending the movable partition panel vertically from the central section of the seat partition base such that the movable partition panel assumes an operative extended second position configuration different from the inoperative first position;
   iii) sliding the movable partition panel horizontally onto the support surface of the partition base, with the movable partition panel maintained in an upright position protruding out of the body of the partition base;
   iv) inserting the lower portion extending from the bottom edge of the partition base between two adjacent seat bottoms; and
   v) pushing the partition base into the space between the seat backs for operative engagement in the space between the seat backs and the bottom of the adjacent seats, whereby a sturdy physical barrier is established that can efficiently separate a space between at least two passengers.

17. The method of claim 16, wherein the seat partition unit is composed of plastic, metal, wood or a combination thereof.

18. The method of claim 16, wherein the sections of the seat partition unit further include a central section, a left section and a right section and the panel after being moved from the first position is further slid horizontally either in a right or left direction and then slid either forward or back on the upper track of the partition base and thereafter placed onto the shelf or upper track in the notches of the support structure of the partition base such that the movable partition panel is maintained in an upright position protruding out of the body of the partition base for engagement of at least a portion of the movable partition panel between the seat backs of the adjacent seats.

19. The kit of claim 15, wherein the sections of the seat partition unit further include a central section, a left section and a right section and the panel after being moved from the first position is further slid horizontally either in a right or left direction and then slid either forward or back on the upper track of the partition base and thereafter placed onto the shelf or upper track in the notches of the support structure of the partition base such that the movable partition panel is maintained in an upright position protruding out of the body of the partition base for engagement of at least a portion of the movable partition panel between the seat backs of the adjacent seats.

20. The seat partition unit of claim 5 further comprising an armrest structure that is sufficiently wide to support a passenger's arm without extending beyond the neighbor-facing surface of the partition base or impede the functionality of the movable partition panel.

* * * * *